US012662067B2

(12) United States Patent
Sanchez Patiño et al.

(10) Patent No.: US 12,662,067 B2
(45) Date of Patent: Jun. 23, 2026

(54) VEHICLE WITH LOCATOR ASSEMBLY CONFIGURED TO MAINTAIN ALIGNMENT OF ADJACENT EXTERIOR COMPONENTS

(71) Applicant: Ford Global Technologies, LLC, Dearborn, MI (US)

(72) Inventors: Francisco Damian Sanchez Patiño, Metepec (MX); Martin D. Lopez, Oakland, MI (US); Miguel Angel Fernandez Vergara, Cuautitlan Izcalli (MX); Jorge Axell Pérez Figueroa, Metepec (MX); Mario Contreras Sosa, Naucalpan (MX)

(73) Assignee: Ford Global Technologies, LLC, Dearborn, MI (US)

( * ) Notice: Subject to any disclaimer, the term of this patent is extended or adjusted under 35 U.S.C. 154(b) by 317 days.

(21) Appl. No.: 18/433,557

(22) Filed: Feb. 6, 2024

(65) Prior Publication Data
US 2025/0249842 A1 Aug. 7, 2025

(51) Int. Cl.
*B60R 13/00* (2006.01)
*B60R 13/04* (2006.01)
(52) U.S. Cl.
CPC ................................... *B60R 13/04* (2013.01)
(58) Field of Classification Search
CPC ......... B60R 13/00; B60R 13/02; B60R 13/04; B60R 13/043

USPC ........................................................ 296/1.08
See application file for complete search history.

(56) References Cited

U.S. PATENT DOCUMENTS

| | | | |
|---|---|---|---|
| 6,074,150 A * | 6/2000 | Shinozaki ........... | B60R 13/0206 24/297 |
| 9,908,484 B2 | 3/2018 | Rogge et al. | |
| 11,279,066 B2 | 3/2022 | Stricher et al. | |
| 2003/0070390 A1* | 4/2003 | Dunn .................... | F16B 5/0664 52/716.7 |
| 2019/0271339 A1* | 9/2019 | Benedetti ................ | F16B 2/245 |
| 2022/0105881 A1* | 4/2022 | Gordon ............... | B60R 13/0206 |

FOREIGN PATENT DOCUMENTS

| | | |
|---|---|---|
| JP | 2593725 Y2 | 4/1999 |
| JP | 4969506 B2 | 7/2012 |
| JP | 2013233884 A | 11/2013 |
| KR | 930005538 B1 | 6/1993 |

* cited by examiner

*Primary Examiner* — Steven O Douglas
(74) *Attorney, Agent, or Firm* — Vichit Chea; Carlson, Gaskey & Olds, P.C.

(57) ABSTRACT

A motor vehicle includes a first exterior component, and second exterior component adjacent the first exterior component. The motor vehicle further includes a locator assembly arranged relative to the first exterior component and the second exterior component. The locator assembly includes an opening and projection, and the projection is configured to be received within the opening so as to restrict movement between the first exterior component and the second exterior component in a forward direction, a rearward direction, a first side direction, and a second side direction.

18 Claims, 5 Drawing Sheets

VEHICLE WITH LOCATOR ASSEMBLY CONFIGURED TO MAINTAIN ALIGNMENT OF ADJACENT EXTERIOR COMPONENTS

TECHNICAL FIELD

This disclosure relates to a motor vehicle with a locator assembly configured to maintain alignment of adjacent exterior components, and a corresponding method.

BACKGROUND

Vehicles include exterior components, such as trim and outer body panels. Outer body panels serve both functional and aesthetic purposes. Outer body panels may be made of sheet metal, or other materials, such as fiberglass, carbon fiber, or fiber-reinforced plastic.

SUMMARY

In some aspects, the techniques described herein relate to a motor vehicle, including: a first exterior component; a second exterior component adjacent the first exterior component; and a locator assembly arranged relative to the first exterior component and the second exterior component, wherein the locator assembly includes an opening and projection, wherein the projection is configured to be received within the opening so as to restrict movement between the first exterior component and the second exterior component in a forward direction, a rearward direction, a first side direction, and a second side direction.

In some aspects, the techniques described herein relate to a motor vehicle, wherein: the first exterior component is forward of the second exterior component, and the opening is provided in an end cap attached to the first exterior component.

In some aspects, the techniques described herein relate to a motor vehicle, wherein the second exterior component includes the projection.

In some aspects, the techniques described herein relate to a motor vehicle, wherein at least a portion of the end cap projects rearward of a gap between a first body panel adjacent the first exterior component and a second body panel adjacent the second exterior component.

In some aspects, the techniques described herein relate to a motor vehicle, wherein the first exterior component includes a channel, and the end cap is partially received in the channel.

In some aspects, the techniques described herein relate to a motor vehicle, wherein: the end cap includes a notch, and the channel includes a projection configured to be received within the notch when the end cap is within the channel.

In some aspects, the techniques described herein relate to a motor vehicle, wherein the opening is centered around an axis extending substantially parallel to a vertical direction.

In some aspects, the techniques described herein relate to a motor vehicle, wherein a contour of the opening is polygonal in shape.

In some aspects, the techniques described herein relate to a motor vehicle, wherein the contour of the opening is rectangular.

In some aspects, the techniques described herein relate to a motor vehicle, wherein a longest dimension of the opening extends substantially perpendicular to a centerline of the motor vehicle.

In some aspects, the techniques described herein relate to a motor vehicle, wherein an outer contour of the projection substantially matches a shape of the opening.

In some aspects, the techniques described herein relate to a motor vehicle, wherein the first exterior component is a glass trim, and the second exterior component is a pillar belt applique.

In some aspects, the techniques described herein relate to a motor vehicle, wherein the first exterior component is a quarter glass trim, and the second exterior component is a rear pillar belt applique.

In some aspects, the techniques described herein relate to a method, including: restricting movement between a first exterior component of a motor vehicle and a second exterior component of the motor vehicle using a locator assembly, wherein the locator assembly includes a projection and an opening, wherein the locator assembly restricts movement between the first exterior component and the second exterior component in a forward direction, a rearward direction, a first side direction, and a second side direction.

In some aspects, the techniques described herein relate to a method, wherein: the first exterior component is forward of the second exterior component, and the opening is provided in an end cap attached to the first exterior component.

In some aspects, the techniques described herein relate to a method, wherein the second exterior component includes the projection.

In some aspects, the techniques described herein relate to a method, wherein at least a portion of the end cap projects rearward of a gap between a first body panel adjacent the first exterior component and a second body panel adjacent the second exterior component.

In some aspects, the techniques described herein relate to a method, wherein the first exterior component includes a channel, and the end cap is partially received in the channel.

In some aspects, the techniques described herein relate to a method, wherein: the end cap includes a notch, and the channel includes a projection configured to be received within the notch when the end cap is within the channel.

In some aspects, the techniques described herein relate to a method, wherein a contour of the opening is polygonal in shape, and wherein an outer contour of the projection substantially matches a shape of the opening.

BRIEF DESCRIPTION OF THE DRAWINGS

In FIG. 3, the end cap is detached from the quarter glass trim.

In FIG. 4, the end cap is received within a channel of the quarter glass trim.

DETAILED DESCRIPTION

This disclosure relates to a motor vehicle with a locator assembly configured to maintain alignment of adjacent exterior components, and a corresponding method. This disclosure permits adjacent exterior components to be readily aligned, in four directions, such as in the forward-rearward and side-to-side directions. These and other benefits will be appreciated from the following description.

Figure 1:
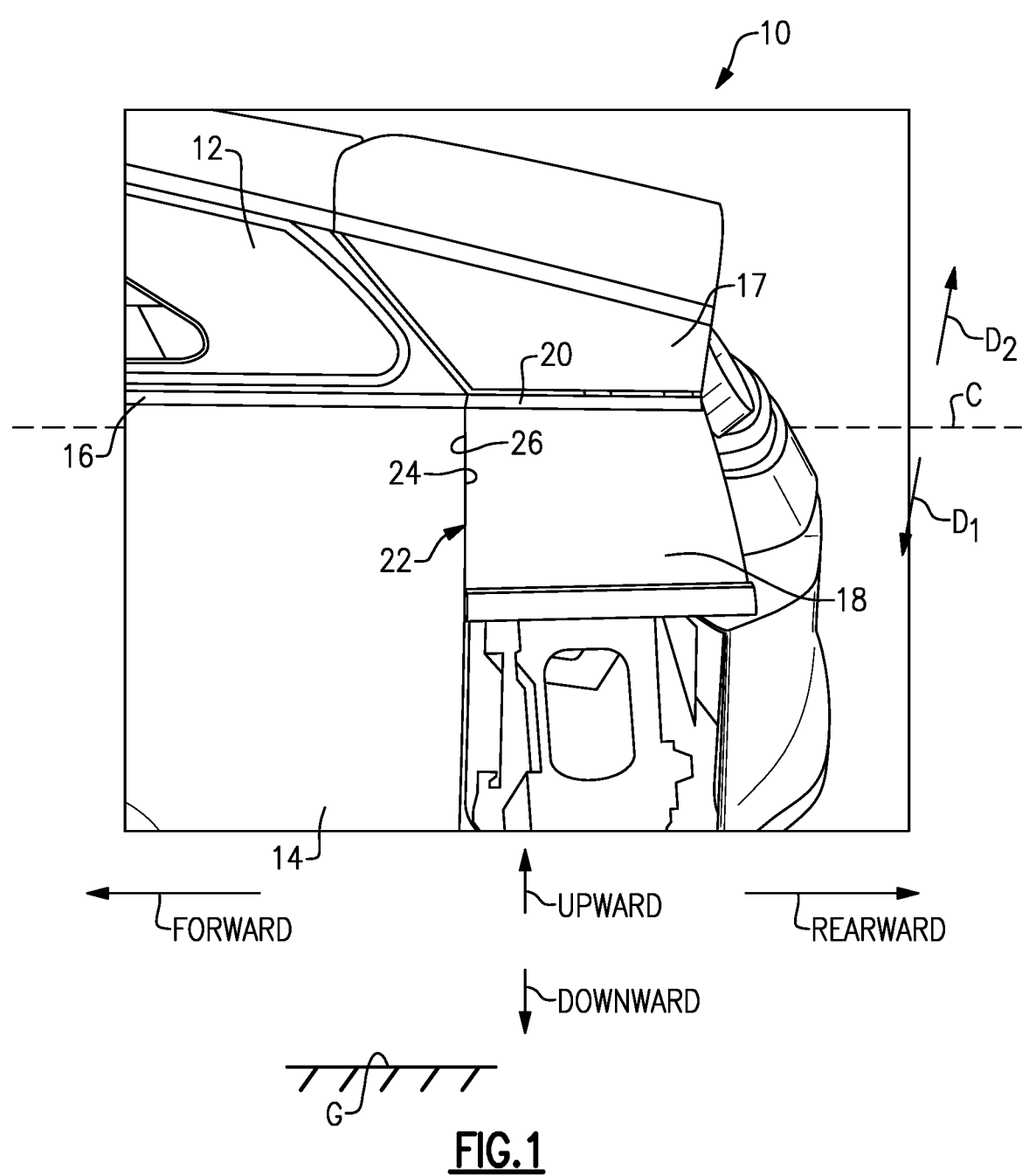
FIG. 1 is a view of a rear portion of a motor vehicle from a first side.

Referring to the drawings, FIG. 1 is view of a rear portion of an exemplary motor vehicle 10 from a first side, which in regions such as North America is the driver side. As shown, the vehicle 10 is a sport utility vehicle (SUV). While an SUV is pictured, this disclosure is also applicable to other types of vehicles, such as passenger cars, vans, and trucks (including pickup trucks).

The vehicle 10 includes a plurality of exterior components, including body panels and trim. As shown, the vehicle 10 includes a quarter glass 12 vertically above (i.e., the "upward" and "downward" directions are labeled in some drawings) a body panel 14. Vertically between the quarter glass 12 and the body panel 14 is a quarter glass trim 16, which may be provided by a molding encapsulating the quarter glass 12. The quarter glass trim 16 extends generally in the forward and rearward directions, which are labeled in some drawings, adjacent a top edge of the body panel 14. The quarter glass trim 16 betters the aesthetics of the vehicle 10. The quarter glass trim 16 may be referred to as a belt or belt trim.

Rearward of the quarter glass 12 and body panel 14 is a liftgate 17 configured to open and close to permit access to and enclose, respectively, an opening in the rear of the vehicle 10. Further, another body panel 18 is rearward of the quarter glass 12 and body panel 14 and vertically below a portion of the liftgate 17. A piece of trim 20 is arranged adjacent a top of the body panel 18. The trim 20 extends in the forward and rearward directions along the top of the body panel 18. The trim 20 betters the aesthetics of the vehicle 10.

Body panels 14, 18 may be made of one or more of metal, fiberglass, carbon fiber, fiber-reinforced plastic, as examples. Quarter glass trim 16 and trim 20 may be made of metal, fiberglass, carbon fiber, fiber-reinforced plastic, plastic, or rubber, as examples.

In an example, the body panel 18 is a rear pillar applique. In that example, the trim 20 is a rear pillar applique belt. The trim 20 may be referred to as a belt or a belt trim.

The quarter glass trim 16 and the trim 20 are substantially vertically aligned in this example. In order to better and/or maintain the aesthetic appearance of the vehicle 10, the quarter glass trim 16 and the trim 20 should be in close proximity to one another. To this end, there is a gap 22 between a rear edge 24 of the body panel 14 and a front edge 26 of the body panel 18. In this disclosure, the spacing between the quarter glass trim 16 and the trim 20 is not entirely dictated by the spacing of the corresponding body panels 14, 18. Rather, in this disclosure, a locator assembly interlinks the quarter glass trim 16 and the trim 20 to ensure a more uniform gap is present between the quarter glass trim 16 and the trim 20, which increases the aesthetic appearance of the vehicle 10. While this disclosure references a locator assembly for a quarter glass trim and a trim arranged relative to a rear pillar applique, this disclosure extends to locator assemblies for other exterior components of a motor vehicle.

Figure 2:
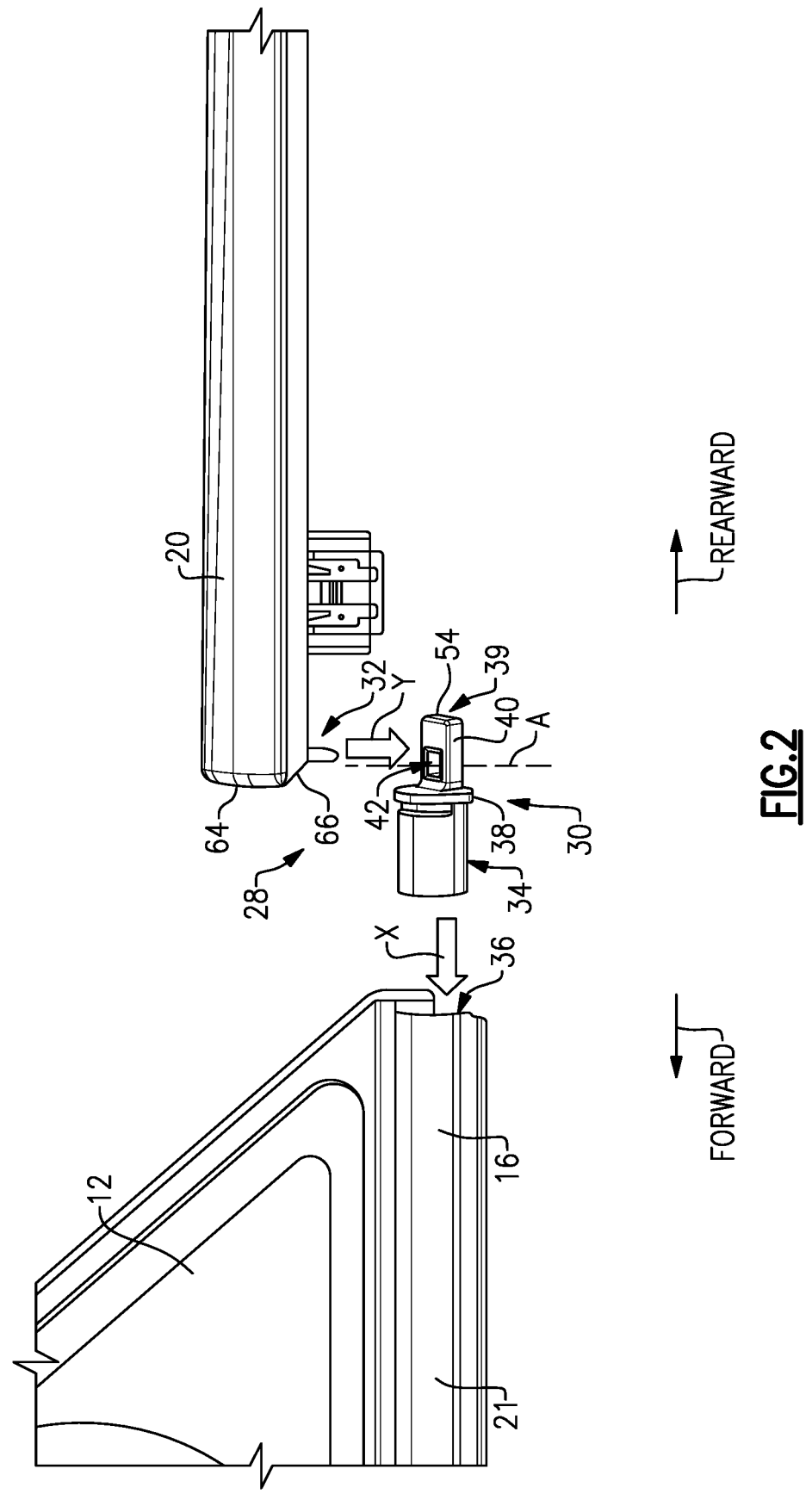
FIG. 2 illustrates an example locator assembly relative to two example exterior components of the motor vehicle.

An example locator assembly 28 is shown in FIG. 2. The locator assembly 28 includes an end cap 30 and a projection 32. The end cap 30 includes a first section 34 configured to be inserted into an end 36 of the quarter glass trim 16. The end cap 30 includes a flange 38 configured to prevent further insertion of the end cap 30 into the end 36, and to prevent ingress of water or debris relative to the end 36. The end cap 30 includes a second section 39 including a tab 40 projecting from the flange 38. The tab 40 includes an opening 42 configured to receive the projection 32.

Figures 3, 4:
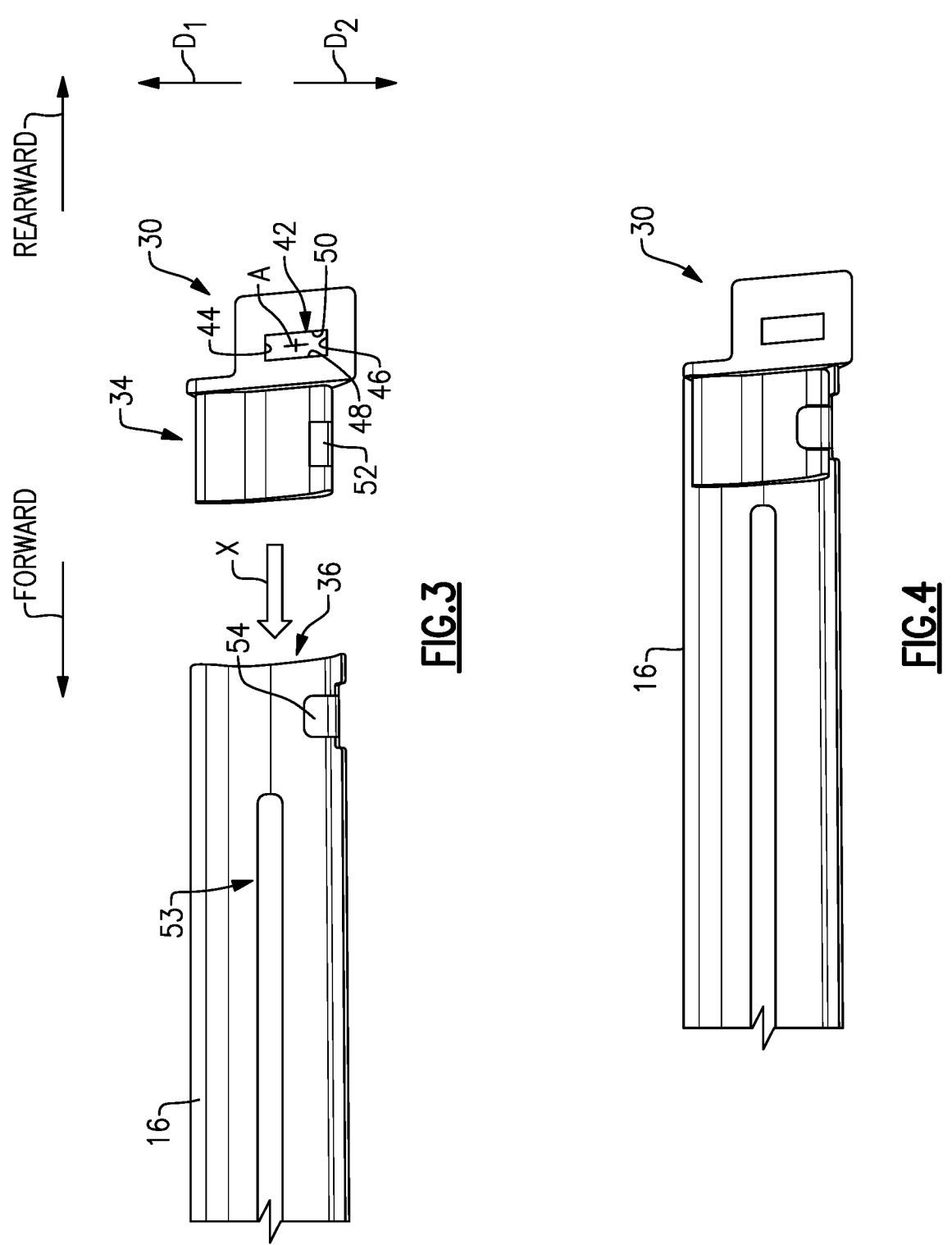
FIG. 3 illustrates a quarter glass trim and an end cap from a bottom.
FIG. 4 also illustrates the quarter glass trim and the end cap from a bottom.

The opening 42, in this example, is centered around an axis A. When the end cap 30 is in the end 36, the axis A extends in a direction substantially parallel to the upward and downward directions, and substantially perpendicular to a ground surface G adjacent the vehicle 10, albeit at a slight incline toward the centerline C of the vehicle 10 to account for the curvature of the outer body panels 14, 18 at the location of the quarter glass trim 16 and the trim 20. The opening 42 is polygonal, in this example. In particular, as shown in FIG. 3, which is a view of the quarter glass trim 16 and the end cap 30 from a bottom, the contour of the opening 42 is rectangular, with the opening being defined by a first side wall 44 spaced-apart from a second side wall 46 in a first transverse direction $D_1$ (first and second transverse directions $D_1$, $D_2$ are labeled in some figures, and are generally opposite to one another and perpendicular with the centerline C) by first and second end walls 48, 50. The first end wall 48 is spaced-apart from a second end wall 50 in the forward direction. The first and second end walls 48, 50 are longer than the side walls 44, 46, in this example, and extend substantially perpendicular to the centerline C.

As shown in FIG. 2, the quarter glass trim 16 exhibits a smooth surface finish on an upper surface 21. A bottom surface of the quarter glass trim 16 is configured as a channel 53, as shown in FIG. 3, configured to receive a portion of the end cap 30. The channel 53 is open in the downward direction and is also open at end 36, in this example.

Further, as shown in FIG. 3, the quarter glass trim 16 and the end cap 30 are configured such that, when assembled, relative movement between the two components in the forward and rearward directions is restricted. In this example, an underside of the first section 34 of the end cap 30 includes a notch 52. The quarter glass trim 16 includes a corresponding projection 54. In order to couple the end cap 30 to the quarter glass trim 16, the first section 34 slides into, and is received in the end 36 of the quarter glass trim 16, by moving the end cap 30 in direction X (FIGS. 2 and 3), such that the projection 54 is received in the notch 52, as shown in FIG. 4. The interface between the notch 52 and the projection 54 restricts relative forward and rearward movement of the end cap 30 relative to the quarter glass trim 16.

Figure 5:
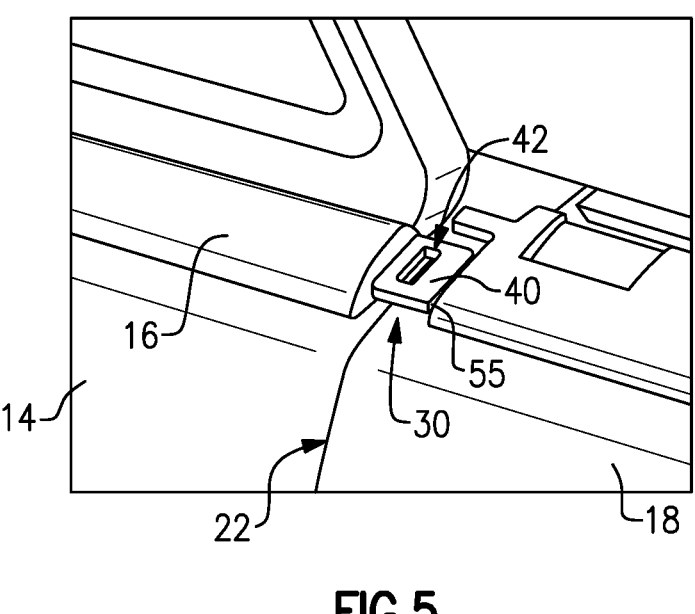
FIG. 5 is a close-up, perspective view of the end cap and quarter glass trim in a partially assembled condition.

With reference to FIG. 5, in one particular aspect of this disclosure, with the end cap 30 arranged relative to the quarter glass trim 16, the end cap 30 at least partially overlaps the gap 22. In the example of FIG. 5, a rearward most end 55 of the tab 40 projects rearward of the gap 22 and is vertically above the body panel 18. In one particular example, the opening 42 at least partially vertically overlaps the gap 22. In either example, the opening 42 is able to receive the projection 32.

Figure 6:
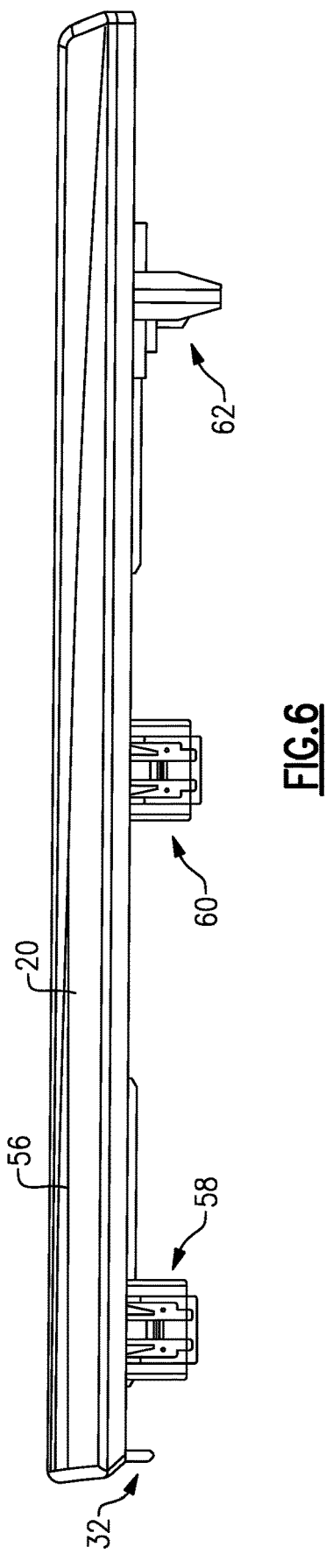
FIG. 6 is a side view of a second piece of trim.

FIG. 6 illustrates the trim 20 detached from the body panel 18. The trim 20 includes an upper surface 56, which includes a smooth surface finish. Opposite the upper surface, a plurality of connectors and/or locators project from the trim 20. In this example the trim 20 includes first and second vertical and cross-car connectors 58, 60, and a cross-car connector 62. The connectors 58, 60 include resilient structures, such as clips, and are configured to fit within openings of the body panel 18, for example, to hold the trim 20 in position relative to the body panel 18 in the upward and downward directions, as well as transverse directions $D_1$, $D_2$. Connector 62 includes resilient structures and is configured to fit within openings of the body panel 18, for example, to hold the trim 20 in position relative to the body panel 18 in the transverse directions D₁, D₂. While three connectors 58, 60, 62 are shown, this disclosure extends to arrangements having a different number of connectors.

The projection 32 is forward of each of the connectors 58, 60, 62. The projection 32 does not include resilient structures, such as clips. The projection 32 is not configured to clip into the opening 42. The projection 32 does not restrict relative vertical movement between the trim 20 and the trim 16. The projection 32 includes an outer contour configured to substantially match the contour of the opening 42, while permitting the projection 32 to slide into the opening 42. In other words, the projection 32 is shaped substantially similar to, but is slightly smaller than, the opening 42.

The projection 32 is spaced-apart rearwardly of a forward-most edge 64 (FIG. 2) of the trim 20. In an example, an underside of the trim 20 exhibits a bevel 66 leading toward the forward-most edge 64. The projection 32 is integrally molded with the trim 20, in one example.

Figure 7:
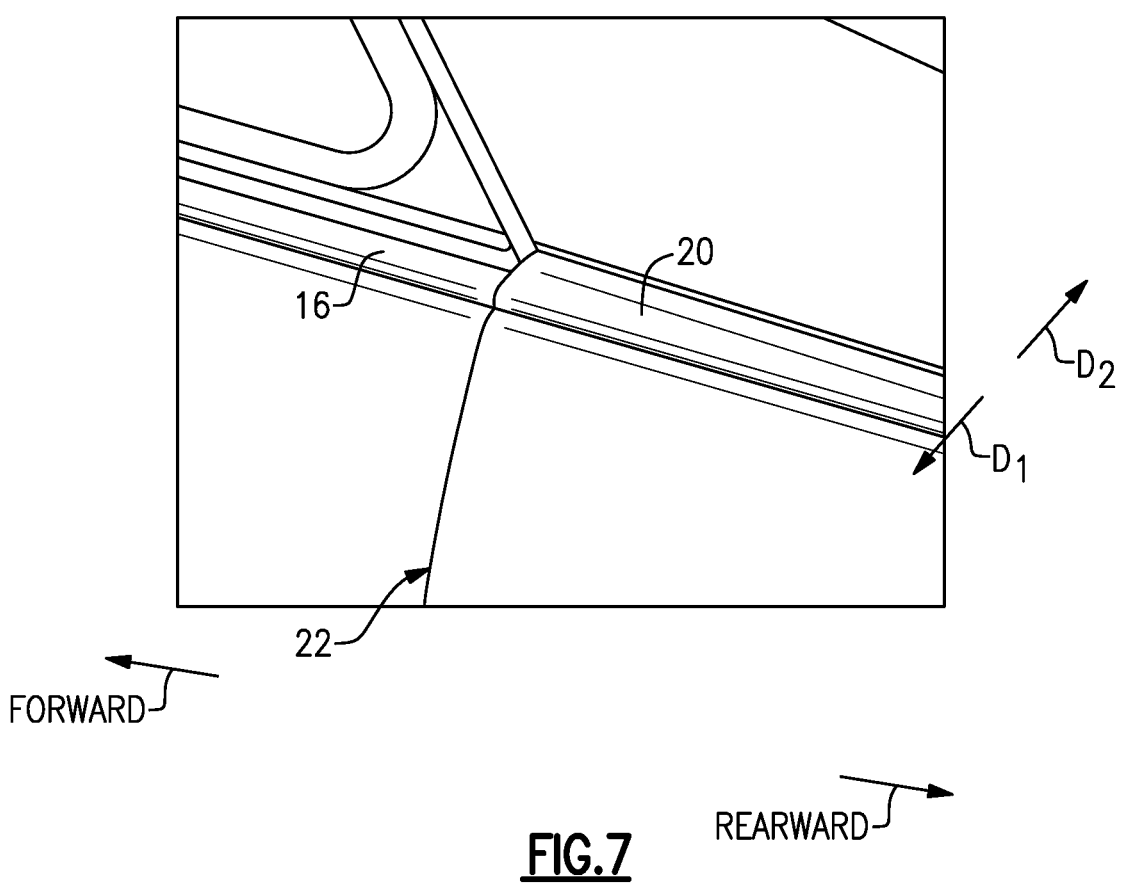
FIG. 7 is a view similar to FIG. 5, with the second piece of trim installed relative to the quarter glass trim using the locator assembly of FIG. 2.

With the end cap 30 in the position of FIG. 5, the trim 20 is moved vertically downward in direction Y (FIG. 2) such that the projection 32 slides into the opening and the connectors 58, 60, 62 form their requisite connections. With the projection 32 received in the opening 42, as shown in FIGS. 1 and 7, the trim 20 is aligned relative to the trim 16 in the forward direction, the rearward direction, the first transverse direction D₁, and the second transverse direction D₂. When received in the opening 42, the projection 32 may contact some, none, or all of the walls 44, 46, 48, 50 depending on the alignment of the various exterior components of the vehicle 10. Further, when the projection 32 is received in the opening 42, the forward-most edge 64 projects forward of the gap 22 in one example. In another example, the forward-most edge 64 vertically overlaps the gap 22 when the projection 32 is received in the opening 42. In still another example, the forward-most edge 64 contacts a rear surface of the flange 38.

While an example locator assembly 28 has been described relative to a first side of the vehicle 10, it should be understood that another, substantially similar locator assembly 28 could be provided on the opposite side of the vehicle 10, with the only differences being that the above-described structures are substantially reflected about the centerline C.

It should be understood that terms such as "about," "substantially," and "generally" are not intended to be boundaryless terms, and should be interpreted consistent with the way one skilled in the art would interpret those terms. Further, directional terms such as "below," "forward," "rearward," "upward," "downward," "vertical," "horizontal," etc., are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
a first exterior component;
a second exterior component adjacent the first exterior component; and
a locator assembly arranged relative to the first exterior component and the second exterior component, wherein the locator assembly includes an opening and projection, wherein the projection is configured to be received within the opening so as to restrict movement between the first exterior component and the second exterior component in a forward direction, a rearward direction, a first side direction, and a second side direction, wherein the first exterior component is forward of the second exterior component, and wherein the opening is provided in an end cap attached to the first exterior component.

2. The motor vehicle as recited in claim 1, wherein the second exterior component includes the projection.

3. The motor vehicle as recited in claim 1, wherein at least a portion of the end cap projects rearward of a gap between a first body panel adjacent the first exterior component and a second body panel adjacent the second exterior component.

4. The motor vehicle as recited in claim 1, wherein the first exterior component includes a channel, and the end cap is partially received in the channel.

5. The motor vehicle as recited in claim 4, wherein:
the end cap includes a notch, and
the channel includes a projection configured to be received within the notch when the end cap is within the channel.

6. The motor vehicle as recited in claim 1, wherein the opening is centered around an axis extending substantially parallel to a vertical direction.

7. The motor vehicle as recited in claim 1, wherein a contour of the opening is polygonal in shape.

8. The motor vehicle as recited in claim 7, wherein the contour of the opening is rectangular.

9. The motor vehicle as recited in claim 8, wherein a longest dimension of the opening extends substantially perpendicular to a centerline of the motor vehicle.

10. The motor vehicle as recited in claim 7, wherein an outer contour of the projection substantially matches a shape of the opening.

11. A motor vehicle, comprising:
a first exterior component;
a second exterior component adjacent the first exterior component; and
a locator assembly arranged relative to the first exterior component and the second exterior component, wherein the locator assembly includes an opening and projection, wherein the projection is configured to be received within the opening so as to restrict movement between the first exterior component and the second exterior component in a forward direction, a rearward direction, a first side direction, and a second side direction, and wherein the first exterior component is a glass trim, and the second exterior component is a pillar belt applique.

12. The motor vehicle as recited in claim 11, wherein the first exterior component is a quarter glass trim, and the second exterior component is a rear pillar belt applique.

13. A method, comprising:
restricting movement between a first exterior component of a motor vehicle and a second exterior component of the motor vehicle using a locator assembly, wherein the locator assembly includes a projection and an opening, wherein the locator assembly restricts movement between the first exterior component and the second exterior component in a forward direction, a rearward direction, a first side direction, and a second side direction, wherein the first exterior component is forward of the second exterior component, and wherein the opening is provided in an end cap attached to the first exterior component.

14. The method as recited in claim 13, wherein the second exterior component includes the projection.

15. The method as recited in claim 13, wherein at least a portion of the end cap projects rearward of a gap between a first body panel adjacent the first exterior component and a second body panel adjacent the second exterior component.

16. The method as recited in claim 13, wherein the first exterior component includes a channel, and the end cap is partially received in the channel.

17. The method as recited in claim 16, wherein:
the end cap includes a notch, and
the channel includes a projection configured to be received within the notch when the end cap is within the channel.

18. The method as recited in claim 13, wherein a contour of the opening is polygonal in shape, and wherein an outer contour of the projection substantially matches a shape of the opening.

\* \* \* \* \*